Nov. 12, 1968     W. G. LIVEZEY     3,410,157

POWER TRANSMISSION

Filed March 9, 1965

|  | REACTION DEVICE | | | | | |
|---|---|---|---|---|---|---|
| RANGE | 31 | 45 | 77 | 75 | 61 | 91 |
| 1 |  | X |  |  | X |  |
| 2 | X |  |  |  | X |  |
| 3 |  | X |  | X |  |  |
| 4 | X |  |  | X |  |  |
| 5 |  | X | X |  |  |  |
| 6 | X |  | X |  |  |  |
| NEUTRAL |  | X |  |  |  |  |
| R-1 |  | X |  |  |  | X |
| R-2 | X |  |  |  |  | X |

INVENTOR.
William G. Livezey
BY
A. M. Heiter
ATTORNEY

United States Patent Office 3,410,157
Patented Nov. 12, 1968

3,410,157
POWER TRANSMISSION
William G. Livezey, Indianapolis, Ind., assignor to General Motors Corporation, Detroit, Mich., a corporation of Delaware
Filed Mar. 9, 1965, Ser. No. 438,332
2 Claims. (Cl. 74—758)

ABSTRACT OF THE DISCLOSURE

Multi-ratio power transmission including compound planetary input splitter unit having a plurality of reduction ratios with a close step therein for driving a three-forward ratio and one-reverse ratio-range unit to provide six forward ratios and two reverse ratios with close steps between the ratios.

---

Figures 1, 2:
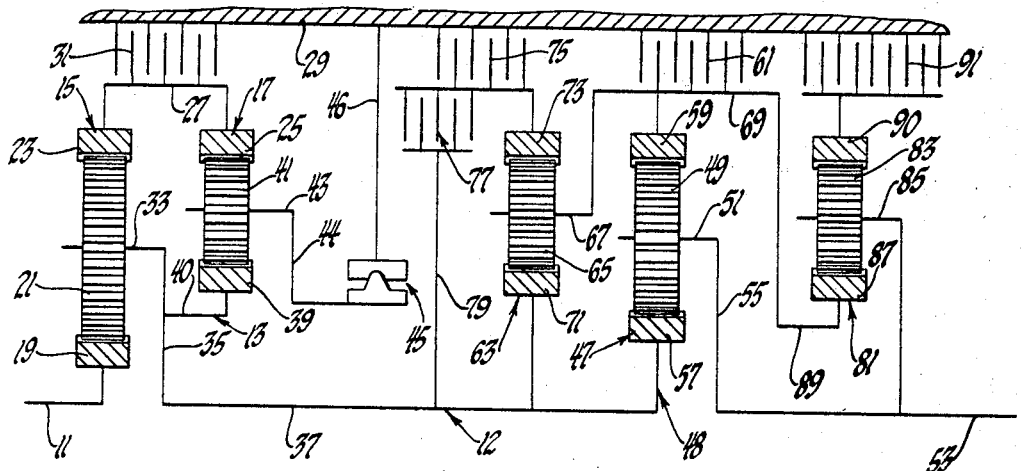

This invention relates to power transmissions and more particularly to a high-speed transmission having a multi-ratio speed-reducing splitter unit and a multi-ratio range unit.

Prime movers such as gas turbine engines require fairly constant engine speeds for maximum performance. Power transmissions having close ratio steps are needed to reduce drag on the engine which possibly would occur in relatively large ratio step transmissions. The desirability for close ratio steps and the lower stall torque ratio of gas turbine engines requires more gear ranges in the power train. Prior power transmissions for such prime movers have frequently utilized a constant speed reduction gear unit at the input of the transmission for initial speed reduction. This unit was coupled with other gear units to provide the range of ratios for effective use in vehicle application. These prior transmissions were generally satisfactory but often involved complex gearing arrangements which did not produce the desired wide-range close step ratios.

The transmission of this invention employs a compound splitter unit having selective high and low drive reduction ratios and does not utilize the prior constant speed reduction gear unit. The splitter unit of this invention is coupled with multi-speed range gearing providing a wide range of forward and reverse drive ratios. The ratios obtainable with this transmission are in substantially a geometric progression with close, even steps between the ratios. This enables the prime mover to be matched with a particular load and provides for smooth vehicle operation when changing ratios. In the splitter low drive ratio, torque is split automatically by the compound planetary splitter unit and recombined at the splitter unit output, thus enabling the splitter unit to be economically constructed with lighter components. The improvements of this invention are accomplished with a minimum of components and without involving complex gearing.

It is an object of this invention to provide a transmission with a new and improved high-speed splitter unit providing a selection of low range output speeds.

Another object of this invention is to provide a transmission having a speed-reducing splitter unit conditionable to transmit and divide input power into separate power paths and to recombine the power paths at the output of the unit to produce a low-range, split torque drive and conditionable to transmit input power to provide a higher speed low-range drive without dividing input power.

Another object of this invention is to provide a transmission having a new and improved variable-ratio, high-speed splitter unit formed by a compound planetary gear set coupled with a variable-ratio range unit which combine to provide a wide range of speed ratios in substantially a geometric progression and with a small step between the adjacent speed ratios.

Another object of this invention is to provide a power transmission having a compound planetary gear set splitter unit providing a selection of different underdrives which are extended by compound planetary range gearing to produce a series of drive ratios which form a geometric progression having a small step between the ratios.

Another object of this invention is to provide a high speed transmission having a variable ratio compound planetary splitter unit providing selective large reduction ratio for splitter low and smaller reduction ratio for splitter high which ratios may be selectively utilized with variable ratio ranges to produce a wide range of transmission ratios.

These and other objects of this invention may be ascertained from the detailed description of a specific and preferred embodiment of the invention and of the drawing thereof, in which:

FIGURE 1 is a diagrammatic representation of one-half of a symmetrical, longitudinal section of a transmission embodying one form of the invention, and FIGURE 2 is a chart showing the application of various friction-engaging devices which may be actuated in a set sequence to produce the forward and reverse drives indicated.

Referring now to the drawings, FIG. 1 discloses an input shaft 11 of vehicle transmission 12 which may be driven by a high-speed power plant, such as a gas turbine engine with an output of 27,500 r.p.m., for example. In order that such high output speeds may be properly utilized in vehicle application there is provided at 13 a splitter unit for initially reducing such speeds. This unit is preferably formed by a compound planetary gear unit which includes a first planetary gear set 15 and a second planetary gear set 17.

As shown, the first planetary gear set includes an input sun gear 19 driven by the input shaft 11, meshing planet pinions 21, and a ring gear 23 which in turn meshes with the pinions. This ring gear is securely connected to a ring gear 25 of the second planetary gear set 17 by a drum member 27. These ring gears are preferably equal in pitch diameter and are adapted to be retarded by grounding to the transmission housing 29 by a reaction device in the form of brake 31 which, when engaged, will condition the splitter unit for splitter high in which speed reduction through an output carrier 33 is obtained. This carrier includes a hub 35 that is joined to an intermediate drive shaft 37.

The second planetary gear set of the splitter unit, in addition to ring gear 25, includes a sun gear 39, larger than sun gear 19, suitably connected to the carrier hub 35 through shaft member 40. Pinion gears 41 of this second gear set mesh with sun gear 39 and ring gear 25. These pinions are rotatably mounted on the carrier 43 which is connected by its hub 44 to a one-way braking device 45, in turn connected to the transmission housing 29 by hub member 46. This one-way braking device will permit the forward rotation of carrier 43, in the well-known manner, but prevents the reverse rotation thereof. Carrier 43, when held by brake 45, provides the reaction for the splitter low in which the largest splitter unit speed reduction is obtained through output sun gear 39 and output carrier 33. It will be appreciated that, since one-way brake 45 engages automatically on reverse rotation of the ring gear 25, only one reaction device needs to be engaged or disengaged by an actuator for producing the two splitter ratios.

Input shaft 11 is connected by the splitter compound planetary gear unit to drive the intermediate drive shaft 37 at a plurality of reduction ratios by the engagement of either the splitter low one-way braking device 45 or the splitter high brake 31. The intermediate drive shaft 37 drives the low-range planetary gear set 47 of the range gearing 48. This planetary gear set includes a plurality of pinions 49 mounted on the carrier 51 which is connected to drive the output shaft 53 through hub 55. Pinions 49 mesh with the sun gear 57 which is connected to the intermediate shaft 37 and ring gear 59 which may be retarded by a low brake 61. This low brake may upon selected application hold the ring gear 59 to the transmission housing 29 to provide the low range drive in the range gearing 48.

The intermediate range planetary gear set 63 of the range gearing includes a plurality of planet pinions 65 which are rotatably mounted on an output carrier 67. As shown, this carrier is connected to the low range ring gear 59 by a drum 69. These pinions mesh with a sun gear 71 which is larger than sun gear 57 and is connected to and driven by the intermediate shaft 37. Ring gear 73 which also meshes with the pinions 65 may be retarded by selected application of brake 75 to connect the ring gear to the transmission housing 29 and thereby provide intermediate drive in the range gearing.

High ratio or direct drive is provided by clutch 77 having one set of clutch plates connected to the ring gear 73 and a second set of clutch plates connected to the intermediate shaft by hub 79. Upon engagement of these clutch plates by a conventional actuator, the planetary gear sets 63 and 47 of the range gearing are locked so that no torque multiplication occurs in the range gearing.

The reverse planetary gear set 81 includes a plurality of planet pinions 83, rotatably mounted on a carrier 85, for driving the output shaft 53. These pinions mesh with the sun gear 87 which is connected by hub 89 and drum 69 to the ring gear 59 of the low-range planetary gear set and carrier 67 of the intermediate-range planetary gear set. These latter pinions also mesh with the ring gear 90 which may be retarded or grounded by the selected application of brake 91. Upon the retardation of this latter-mentioned ring gear, the reverse planetary gear set will be conditioned to produce reverse rotation of the output shaft 53.

With the preferred embodiment of the invention, it will be seen from the chart of FIG. 2 that at least six forward and two reverse drive ratios can be obtained by combining splitter unit high or low with the low, intermediate, high or reverse drives of the range gearing.

Thus, in the lowest drive range, which is drive 1 of the chart of FIG. 2, one-way brake 45 of the splitter unit is on and the low range planetary gear set 47 of the range gearing has gear 59 retarded by selected application of brake 61. In the splitter unit, the sun gear 19 is driven forwardly at input speed. Pinion 21 will be rotated in a reverse direction and, since ring gears 23 and 25 are not at this time retarded by brake 31, they will also be driven in a reverse direction. One-way brake 45 automatically engages and holds carrier 43 from reverse rotation while the output sun gear and output carrier will be driven forwardly at a reduced speed and with increased torque to provide splitter low. The splitter unit provides separate power paths in the gearing which are combined at carrier hub 35 providing a split torque drive for intermediate shaft 37. Since the brake 61 is applied in the range unit to hold the ring gear 59 of the low planetary gear set, further torque multiplication and decreased output speed occurs in this gear set as the pinions 49 driven by sun gear 57 walk forwardly in the ring gear 59 and drive output carrier 51 and connected output shaft 53.

In the second drive range, indicated as range 2, brake 31 is engaged to hold the ring gears 23 and 25 of the splitter unit to condition this unit for splitter high which will provide for speed reduction but with greater speed than that obtained with splitter low. In this condition, when the splitter sun gear 19 is driven forwardly and the ring gear 23 is held, the carrier 33 is driven forwardly. The second planetary gear set of the splitter unit in splitter high is ineffective and carrier 43 will rotate forwardly disengaging the one-way brake. Since brake 61 is still applied in the range unit, that unit will function as described in connection with the first drive range and output shaft 53 is driven at a reduced speed but which, due to splitter high drive, is higher than the speed of the first drive range.

For intermediate range drives which are ranges 3 and 4 of the FIGURE 2 chart, the ring gear 73 of the intermediate planetary gear set 63 is retarded by application of brake 75. For range 3 the one-way brake is on in the splitter unit for splitter low and the driven intermediate shaft 37 drives the sun gears 71 and 57 forwardly at the reduction ratio provided by splitter low. The carrier 67 of the intermediate gear set 63 drives the ring gear 59 forwardly at a reduced speed. The low range gear set 47 acts as a combining planetary gear set with sun and ring gear input and with carrier 51 providing an output to drive output shaft 53 at a reduced speed which is greater, however, than the reduced speeds of ranges 1 and 2. For the fourth drive range the range gearing is conditioned as for the third drive range but the splitter unit is conditioned for splitter high. The intermediate shaft 37 will thus be driven at a higher speed which will be reflected in a higher speed of output shaft 53 driven in the manner described in connection with the third drive range.

For high drive ranges, which are ranges 5 and 6 on the chart of FIG. 2, the planetary gear set 63 is locked for direct drive by application of clutch 77 so that all speed reduction is performed by the splitter unit. Thus, for fifth range, one-way brake 45 is on providing the largest splitter reduction ratio with corresponding speed reduction. For sixth range, ring gear 23 is retarded for the smallest reduction ratio and the highest output speed.

In the neutral range only one-way brake 45 of the splitter unit is on and no reaction device is applied in range gearing. Under these conditions output shaft 53 will not be driven as indicated.

For reverse drive R–1 the splitter unit is conditioned for splitter low and the ring gear 90 of the reverse planetary gear set is held for reaction by application of brake 91. The sun gear 57 of the low planetary gear set is driven by the intermediate shaft 37 in a forward direction and ring gear 59 will be driven rearwardly. The sun gear 87 of the reverse planeary gear set which is coupled to the low ring gear 59 will be driven rearwardly and the carrier 85 will thus be driven in that direction as the pinions 83 walk in the reaction ring gear. For reverse drive R–2 the same action occurs in the range gearing but the splitter unit is conditioned for splitter high and the reduction ratio is lower than that of the first reverse drive and with corresponding higher output speed.

In the range gearing of the FIG. 1 transmission the relationship of sun gear 57 and ring gear 59 for range low, and of sun gear 57 to sun gear 71 for range intermediate are such that even step low, intermediate and high drive ratios are provided. In the splitter unit the relationship of sun gear 19 to ring gear 23 for splitter high and the relationship between ring gear 23 and ring gear 25 and sun gear 19 to sun gear 39 for splitter low are such that the splitter high and low ratios are compatible with the even step ratios of the range unit to provided a plurality of transmission ratios in a geometric progression with a small step in between and which are double the number of ratios in the range gearing.

With a particular selection of gear teeth numbers for the gear components of the splitter unit and the range gearing the following ratios are obtained: Splitter low 7.82, splitter high 5.55, range low 4, range intermediate 2 and range high 1. Also, the range reverse gear set components may be provided with a selected number of teeth which provides a ratio of 5. It will be appreciated that the splitter low and high ratios combine with the range gearing to produce transmission ratios of 31.3, 22.2, 15.6, 11.1, 7.82, 5.55 for ranges 1 through 6, respectively, and ratios of 39.1 and 27.7 for reverse ranges R–1 and R–2, which form the desired geometric progression. The step of 1.4 between the splitter unit ratios is the same as the 1.4 step between the overall transmission ratios and is smaller than the step between the range ratios. It will be observed that applicant has doubled the number of ratios of the range gearing and has provided for smaller steps between the ratios. The speed reduction provided by such ratios reduces example input speed from 27,500 r.p.m. to a useable forward drive range of 880 r.p.m. to 4,960 r.p.m. depending upon drive range selection.

Although a particular embodiment of the invention has been shown and described, it is to be understood that other embodiments and modifications may be designed utilizing applicant's teachings. Thus, the splitter unit and range gearing may be modified from the preferred arrangement shown and described without departing from this invention as defined in the claims. For example, a splitter low ratio may be made larger by increasing the pitch diameter of sun gear 39 or by reducing the pitch diameter of ring gear 25. Furthermore, any suitable friction-engaging devices may be used in this power train in any known way in a set sequence, for example by electric, hydraulic, pneumatic or some mechanical provision. Therefore, my invention is not to be limited to the particular embodiment shown and described but only by the claims which follow.

I claim:

1. In a power transmission having an input and an output, the combination of a splitter unit and a range gear unit means, said splitter unit being formed by first and second planetary gear sets; said first planetary gear set having an input sun gear, a ring gear, pinions meshing with said sun and ring gears, and a carrier for said pinions; said second planetary gear set including a ring gear, a sun gear, pinions meshing with said last mentioned sun and ring gears, and a carrier for said last mentioned pinions; drive means connecting said ring gears to each other, drive means connecting said first mentioned carrier to said sun gear of said second gear set, drive establishing means consisting solely of a first reaction device for selectively holding said ring gears from rotation to condition said splitter unit for a first reduction ratio with said first mentioned carrier being driven to provide splitter unit output and a second reaction device operatively connected to said carrier of said second planetary gear set engageable to condition said splitter unit for a larger reduction ratio with power supplied to said input sun gear being split and transmitted by said first mentioned carrier and said second mentioned sun gear, a drive shaft connected to said second mentioned sun gear and said first mentioned carrier, said range unit means having a plurality of operatively connected planetary gear sets providing a forward drive having a 1:1 or lower ratio and a reverse reduction drive, said range unit means having an input means operatively connected to first mentioned carrier and said second mentioned sun gear, and having output means connected to said transmission output, and a separate friction drive establishing device for each of said gear sets of said range unit and selectively engageable to condition said range unit for forward and reverse drive ratios.

2. In a power transmission having an input drive and output drive; the combination of splitter planetary gear means providing only a first and a second forward reduction ratio drive including a sun gear member, a ring gear member, planetary pinions interconnecting said sun and ring gear members mounted on a carrier member, one of said members being directly connected to said input drive, another of said members being an output member, drive establishing means consisting solely of a first friction device operatively connected to said splitter gear means selectively engageable to condition said splitter gear means for said first reduction ratio drive and a second friction device operatively connected to said splitter gear means selectively engageable to condition said splitter gear means for said second reduction ratio drive, a rear gear unit means having operatively connected planetary gear sets providing a plurality of forward drive ratios having a 1:1 or lower ratio and a reverse reduction drive ratio, said rear gear unit means having an input directly connected to said splitter output member and having an output member connected to said transmission output, a third selectively engageable friction device operatively connected to said rear gear unit means engageable to condition said rear gear unit means for a low speed forward ratio and to condition said transmission for a low speed forward ratio when said first friction device is applied and a higher speed forward ratio when said second friction device is applied, a fourth selectively engageable friction device operatively connected to said rear gear unit means to condition said rear gear unit means for a higher speed forward ratio, and a fifth selectively engageable friction device operatively connected to said rear unit engageable to condition said rear gear unit means for a reverse drive ratio and said transmission for a first range reverse drive ratio and said transmission for a first range reverse drive when said first friction device is applied and a second range reverse drive when said first friction device is released and said second friction device is applied.

References Cited

UNITED STATES PATENTS

| | | | |
|---|---|---|---|
| 2,251,625 | 8/1941 | Hale | 74—764 |
| 2,395,459 | 2/1946 | Carnagua | 74—759 |
| 2,806,388 | 9/1957 | Simpson | 74—759 |
| 2,856,794 | 10/1958 | Simpson | 74—763 |
| 2,873,626 | 2/1959 | Granryd | 75—765 |
| 2,890,603 | 6/1959 | Harris et al. | 74—769 X |
| 2,899,846 | 8/1959 | Tuck | 74—759 |
| 2,929,272 | 3/1960 | Miller | 74—759 |
| 2,990,727 | 7/1961 | Miller | 74—763 |
| 3,157,067 | 11/1964 | Tuck et al. | 74—688 |
| 3,181,677 | 5/1965 | Fisher et al. | 192—4 |

FRED C. MATTERN, JR., *Primary Examiner.*

T. C. PERRY, *Assistant Examiner.*

UNITED STATES PATENT OFFICE
CERTIFICATE OF CORRECTION

Patent No. 3,410,157                                          November 12, 1968

William G. Livezey

It is certified that error appears in the above identified patent and that said Letters Patent are hereby corrected as shown below:

Column 4, line 64, "provided" should read -- provide --. Column 6, line 37, after "reverse" cancel "drive ratio and said transmission for a first range reverse".

Signed and sealed this 10th day of March 1970.

(SEAL)
Attest:

Edward M. Fletcher, Jr.                        WILLIAM E. SCHUYLER, JR.
Attesting Officer                                      Commissioner of Patents